Jan. 1, 1935.  B. BALSA  1,986,314
SAFETY DEVICE FOR MOTOR VEHICLES AND THE LIKE
Filed Dec. 3, 1932  4 Sheets-Sheet 1

Inventor
Bautista Balsa
By C. F. Wenderoth
Atty.

Jan. 1, 1935.   B. BALSA   1,986,314
SAFETY DEVICE FOR MOTOR VEHICLES AND THE LIKE
Fig. 3   Filed Dec. 3, 1932   4 Sheets-Sheet 2
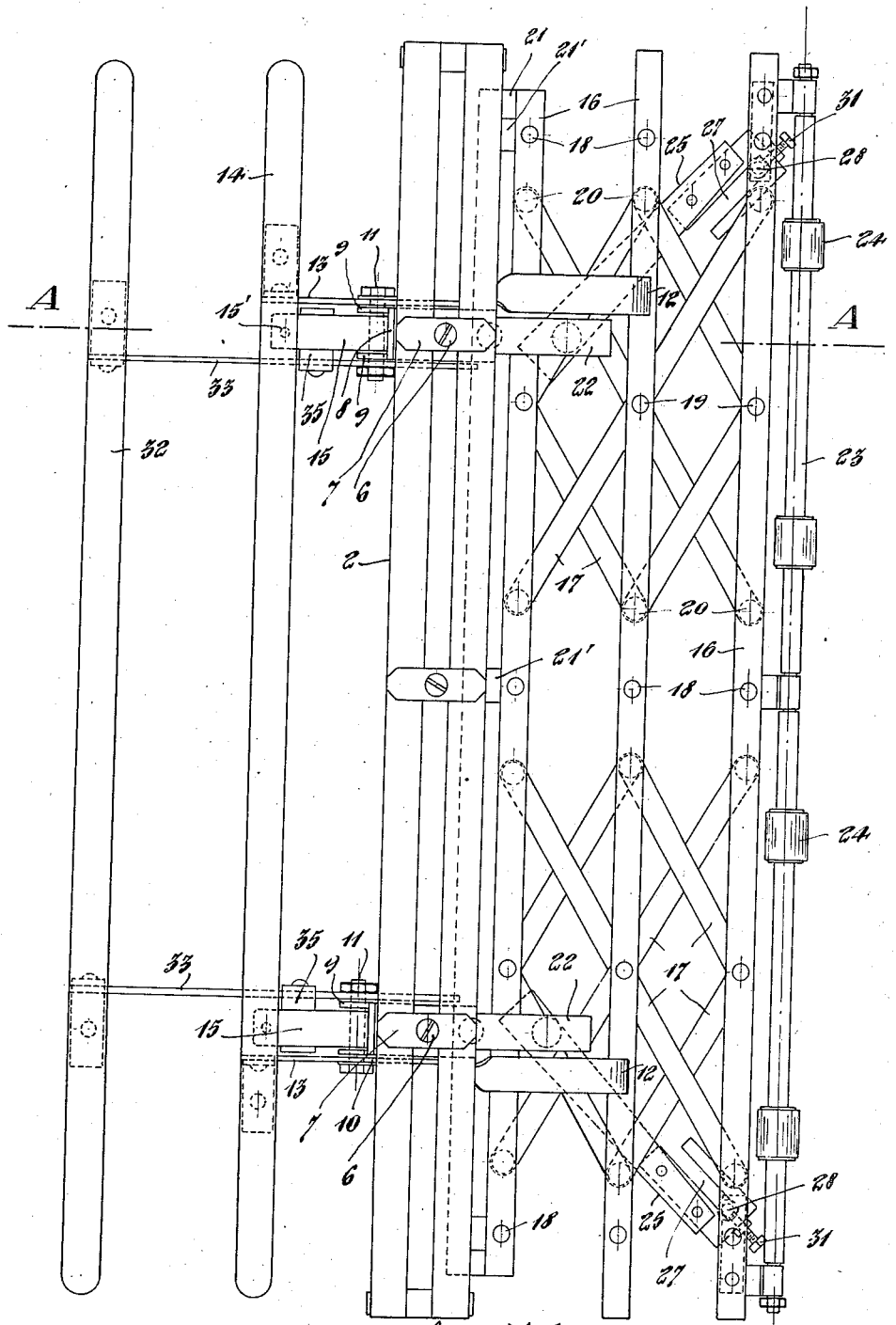
Inventor Bautista Balsa
By E. F. Wenderoth Atty Jan. 1, 1935.   B. BALSA   1,986,314
SAFETY DEVICE FOR MOTOR VEHICLES AND THE LIKE
Filed Dec. 3, 1932   4 Sheets-Sheet 3
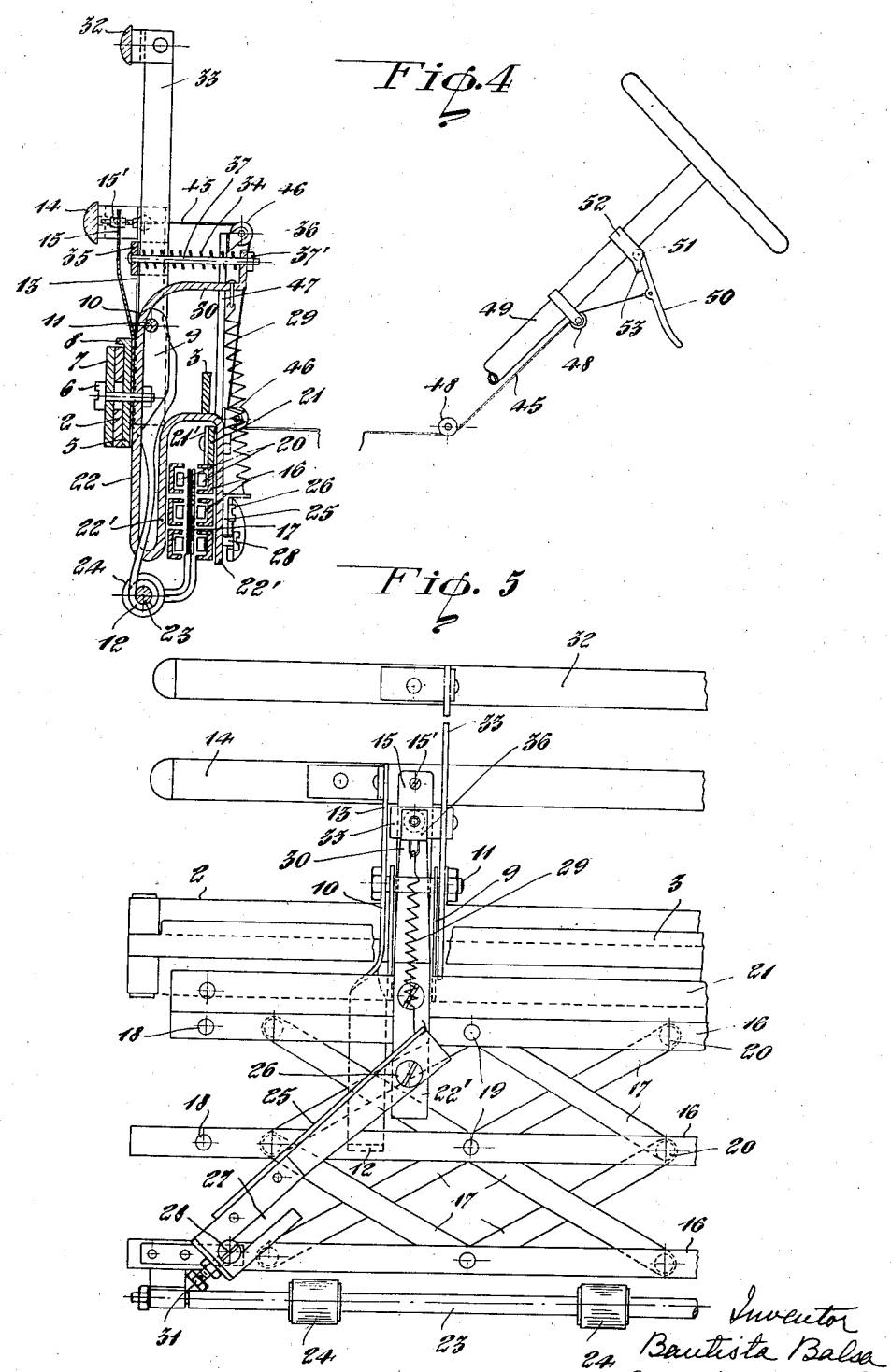

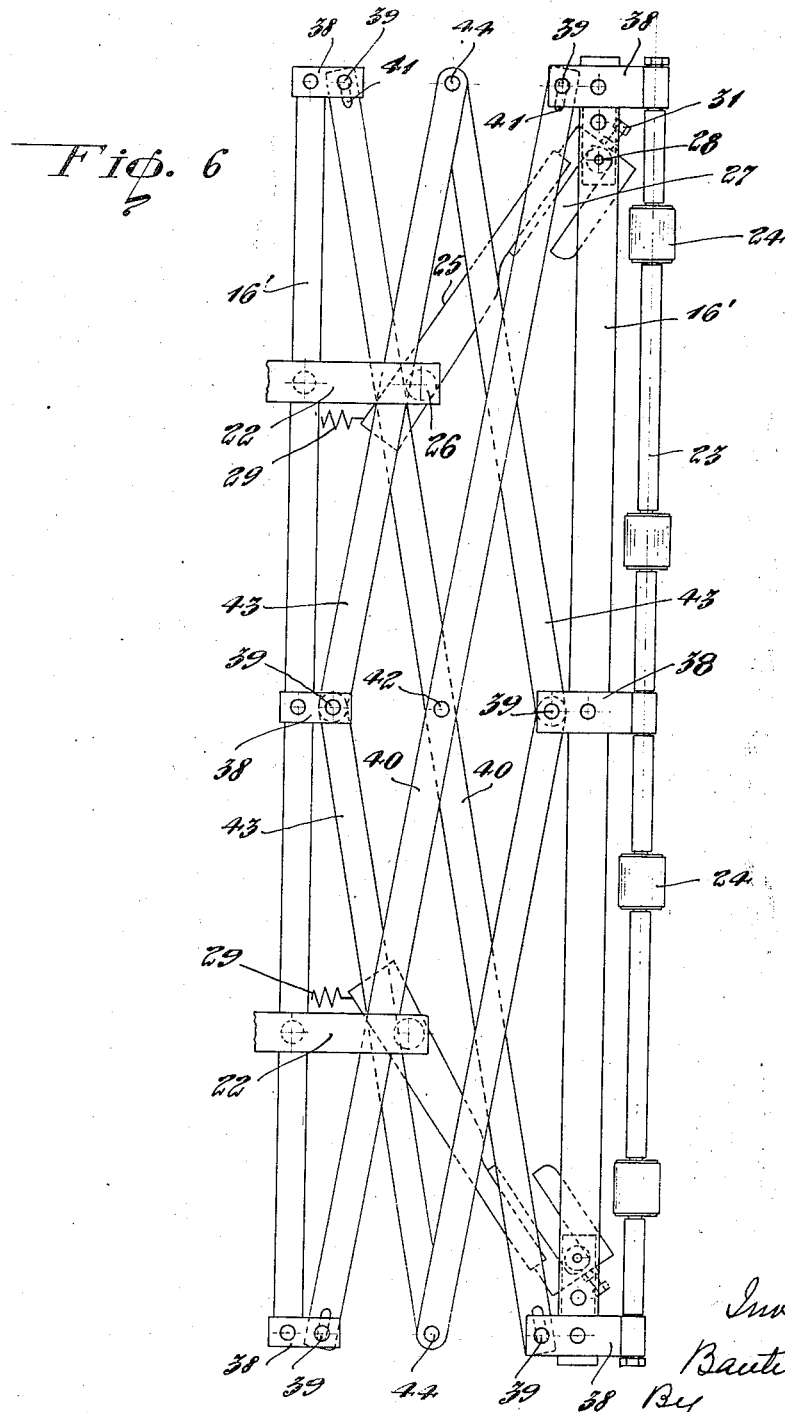

Patented Jan. 1, 1935

1,986,314

UNITED STATES PATENT OFFICE 1,986,314

SAFETY DEVICE FOR MOTOR VEHICLES AND THE LIKE

Bautista Balsa, Buenos Aires, Argentina

Application December 3, 1932, Serial No. 645,623
In Argentina September 17, 1932

2 Claims. (Cl. 293—37)

The present invention refers to a new safety device which may be applied to automobile vehicles of any kind and has for its object the provision of a safety device whose operation shall be absolutely reliable and automatic, which shall not interfere with the running of the vehicle, shall not be bulky nor of unæsthetic appearance, but cheap and simple to construct and easy to fit.

This apparatus comprises essentially an extensible trellis located below the front bumpers and normally retained in retracted condition by a number of detents integral with a plurality of bumper bars located above the bumper, the said bars, when receiving an impact from an obstacle, causing the release of the trellis which immediately extends itself down to the ground, thus covering the space in front of the vehicle wheels and preventing the person hit from being run over.

For the better understanding of the invention and of the manner in which the same is to be performed, it has been illustrated by way of example in the accompanying drawings in which:

Fig. 3 is a more detailed front view of the same in its lowered position.

Fig. 4 is a section along A—A in Fig. 3, with the addition, in diagrammatic form, of a device for releasing the trellis from the driver's seat.

Fig. 5 is a part view from the rear corresponding to Fig. 3.

Fig. 6 represents another type of extensible trellis.

In all of the said figures the same reference characters indicate like and corresponding parts.

Figure 1:
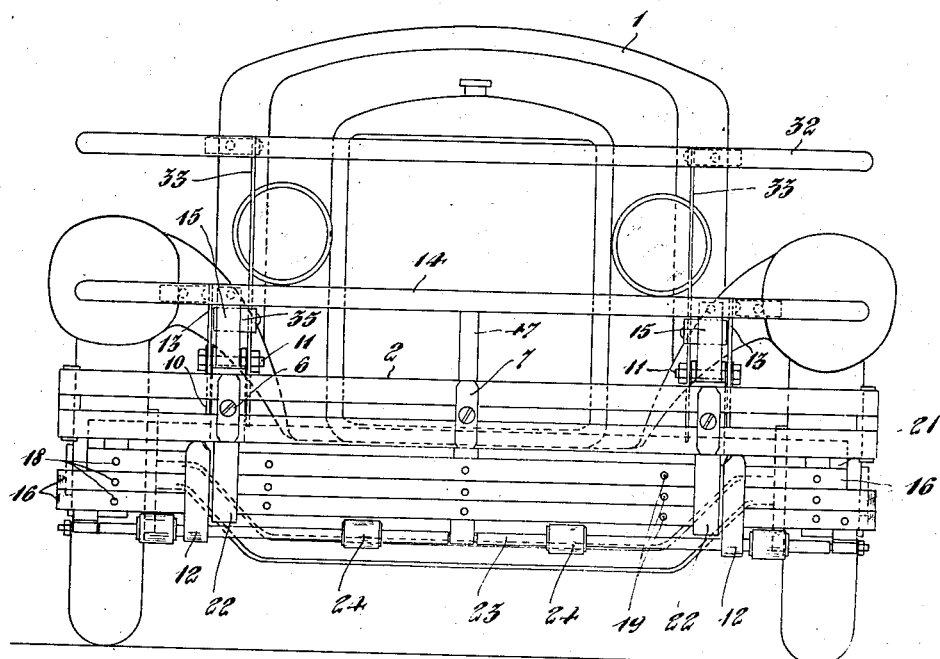
Fig. 1 is a front view of one form of the safety device which is the object of the present invention, mounted on a motor-car, and illustrated in its raised position.

Referring to Figs. 1 to 5, there is mounted upon a motor vehicle, indicated by the general numeral 1, in the usual manner, a front bumper 2 of the known type having plane bars, by means of its rear plane bar 3 and the supports 4 which connect it to the ends of the frame members.

The safety apparatus is secured to the said bumper in such wise that the part thereof which is intended to protect the person is situated below the bumper and the operative part is positioned thereabove.

The parts are thus secured by means of two supports 5 fixedly mounted behind the bumper at a certain distance from each end thereof by means of a pin 6 and a supporting plate 7 disposed in front of the bumper in such wise that the latter is clamped between parts 5 and 7. The support 5 carries an upper flange 8 bearing on the edge of the upper bar of the bumper and two rearwardly directed vertical wings 9 which serve to support the operating device. This device comprises two vertical pieces 10 (one on each support 5) articulated on a horizontal pin 11 carried by the wings 9 of said support 5 and terminating at their lower end in a hook 12.

Its upper part 13 carries the horizontal bumper bar 14 located a short distance above the bumper.

Figure 2:
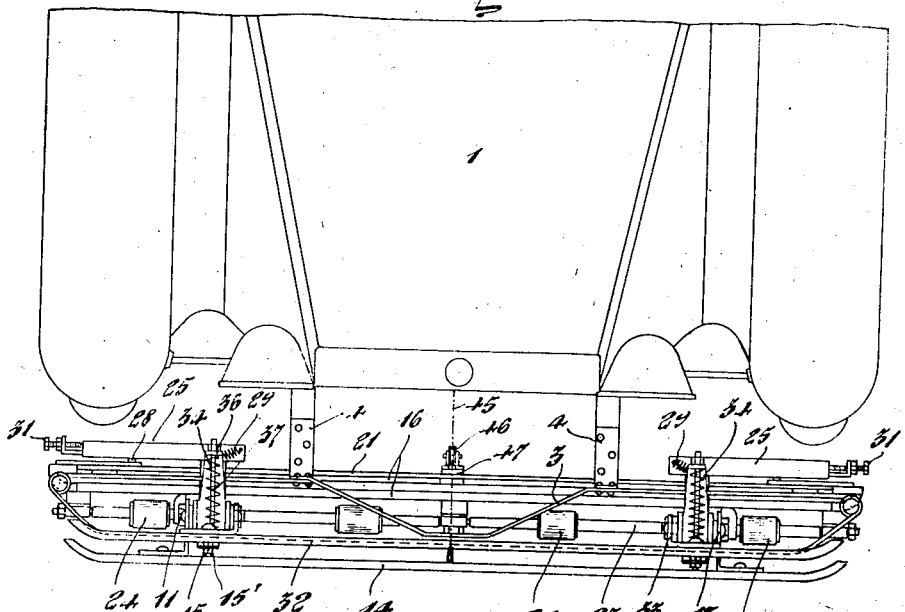
Fig. 2 is a plan of the same.

A number of leaf-springs 15 mounted on supports 5 bear against the rear of the bar 14 so that it is normally held in a forward direction, in which position the said bar is in a vertical plane forward of the bumper, so that the person run into will strike it before hitting the bumper, whereby the blow is already deadened and at the same time the safety device will be operated. The said bar preferably has a half-tubular section so as not to present angular parts capable of doing injury and its ends will, for the same purpose be bent towards the rear as seen in Fig. 2.

Springs 15 carry at their ends an adjusting screw 15' which engages a rearward portion of the bar 14 and allows the pressure of the spring on the bar to be regulated.

The protective part of the device consists of a kind of articulated trellis which is extensible and is formed of horizontal bars 16 connected together by diagonal bars 17 forming the lazy-tongs or articulated parallelograms which permit of the extension and collapse of the trellis. These bars 16 each consist of two U-irons riveted together with their channel parts opposing each other by rivets 18 in such a manner that a space remains between their legs in which bars 17 may move. The latter are secured to the said bars by means of pins 19 and carry at their ends rollers or pins 20 adapted to run in the channels formed by the U-irons.

The upper bar 16 is secured to another adjacent bar 21 situated above the former by means of the connecting strips 21'. This bar 21 is in its turn mounted on two supports 22 secured to the supports 5. Said supports 22 act moreover as guides for the trellis in its collapsed position for which purpose they are provided with two vertical arms 22' joined together in their upper parts and leaving between them an opening in their lower parts, between which the collapsed trellis is positioned as can be seen in Fig. 4.

The lower bar 16 carries in its turn a rounded bar 23 positioned slightly lower and more forwardly than the former, the said bar 23 acting as a shaft for the freely rotatable rollers 24 disposed end to end along the whole width of the safety device. These rollers are preferably covered on their outside with rubber. The location of said rounded bar is such that, when the trellis is in collapsed condition, it engages with the hooks 12 of the actuating device thus keeping the trellis raised.

In order to maintain the rigidity of the expanded trellis, in the vertical plane, and to obtain a rapid expansion there are provided two arms 25 movably mounted at one end on the rearward portion of each support 22' as shown at 26, and having at the other end a longitudinal groove 27 in which moves a stud 28 fixed to the rearward part of the lower bar 16. The movably mounted end of said arm is slightly prolonged beyond the pin 26 and is connected to the end of a tension spring 29 fastened at its other end to the general support 5. This spring tends to cause the arm 25 to move downwardly and to expand the trellis connected to the end of said arm. The latter moves in a vertical plane parallel to the trellis and thus assists in maintaining the latter rigid in a vertical direction. The arms 25 carry in the bottom of their groove 27, an adjusting screw 31 adapted to make contact with the stud 28 and permitting the desired amount of drop of the trellis to be easily adjusted, stopping it at a short distance from the ground if it is not desired that it should make contact therewith. In this way the need for constructing and adapting an arm 25 for each type of car is obviated.

In addition to the extensible trellis, which serves to protect people from falling under the wheels of the vehicle, another protecting element is provided intended to prevent people from striking the upper parts of the car, such as the head-lamps and the radiator.

This element comprises a horizontal bar 32 located in parallel spaced relation with respect to the bumper bar 14 on a level with the upper part of the head-lamps and a little further to the rear than said bar 14. The bar 32 is supported by two oscillating arms 33 each of which is mounted on one of the wings 9 of each of the supports 5 in such a way that they can rock from front to rear in a manner similar to the bar 14. In order to hold said bar normally in a forward position and to provide a shock-absorbing effect, there is disposed on each support 5 a helical compression spring 34 which at one end bears against a projection 35 of the arm 33 and at the other, against a bearing surface 36 integral with the support 5. In order to limit the forward movement of the bar 32, there are provided, integral with projections 35, the retention rods 37, which pass through the springs 34 in order, at the same time, to act as guides for the latter, and project through the end of the bearing surface 36 carrying at their threaded end a nut 37' so as to adjust the forward position of said bar 32.

Fig. 6 shows a type of trellis simpler and more economical and flexible than that hereinbefore described, which may be suitable for different cases. Apart from the design of the trellis itself, the apparatus as a whole is not changed, wherefore it will be sufficient to describe only the trellis. This comprises two horizontal bars 16', the upper one of which is fixedly secured to the support 22 and the lower one of which carries, as in the previous case, the bar 23 with its rollers 24. These two bars 16' carry at their ends and in the middle, a number of fixed vertical plates 38, each one of which bears a pin 39 on which one of the movable bars of the trellis is mounted. Each one of the ends of the bars 16' is thus connected to the opposite end of the other by means of a diagonal movable arm 40 provided at its end with a longitudinal groove 41 in order to allow of its displacement relative to pin 39. There are thus two arms 40 which are loosely connected one to the other at their mid-points by means of a pin 42.

On the central pin of each bar 16' there are loosely mounted at their ends, two arms 43 the other ends of which are loosely coupled to the corresponding ends of the opposite pair of similar arms, by means of a pin 44.

In Fig. 4 there is diagrammatically shown an accessory which allows the driver to operate the apparatus at will. To this end, there is provided a cable 45 attached to the centre of the bumperbar 14, which passes over guides 46 mounted on a support 47 fixedly secured to bar 21, extends below or alongside of the motor and thereafter passes over guides 48, fixedly secured to, or in the neighbourhood of, the steering column 49, terminating at one end of a control lever 50. This control lever is pivotally mounted on a clip 52 clamped to the steering column and provided with a stop 53 for retaining said lever in its inoperative position as indicated in Fig. 4 in which it may be seized by the hand and raised in order to impart to the cable the pull necessary to free the trellis.

The operation of the safety device is easy to understand.

When the bumper-bar 14 receives a backwardly directed blow, due to striking an individual, it will displace the vertical parts 10, overcoming the action of the springs 15, which at the same time deaden the blow, and causing the hooks 11 to release the rounded bar 23 which allows of the instantaneous expansion of the trellis under the combined action of gravity and of the springs 29.

The rollers 24 prevent the bar 23 from coming into contact with the ground, and permit the trellis to run freely over the ground on a par with the automobile.

The expanded trellis constitutes, as will be understood, as it were, a vertical wall which at all points makes it impossible for a person who has been run into to fall under the wheels of the vehicle. The height of the bumper-bar 14 is such that it will ensure the operation of the apparatus in all cases because even a child or a person who has fallen will always manage to touch it.

As far as the upper shock-absorbing bar 32 is concerned, it will, in addition, prevent taller persons from striking the radiator or the head-lamps.

In those equipments in which there is provided the device which permits the driver to operate the apparatus at will, even greater safety will be obtained, since the driver, if he pays attention, could let the trellis drop before the collision occurs.

On the other hand, the lower bar 14 does not run the risk of being struck by another car and of bringing about an untimely drop of the trellis because it is at a sufficient height not to come into contact with any bumpers in normal position.

Moreover, the trellis, in its raised position, does not in any way interfere with the running of the car due to the fact that its minimum clearance is greater than that of the front axle of the car.

From the æsthetic point of view this apparatus does not destroy the harmony of the lines of the car as it shows merely a number of horizontal bars located above and below the bumper which are thus almost taken for a part thereof, the remaining members of its simple mechanism being hidden in the rearward portion.

The fitting of this apparatus, as has been seen, necessitates no modification in the vehicle since it is secured by two pins to the bumper.

Only a small modification in the supporting members 5 will be necessary to adapt the apparatus to any normal type of bumper, whether it be for a motor-car, a lorry or an omnibus.

It is clear that various modifications may be made in the construction and details without thereby departing from the spirit of the invention, which is clearly ascertained in the claims which follow the present description.

Having now particularly ascertained and described the nature of the present invention and the manner in which it is to be performed what is claimed as exclusive property and right is:

1. A new safety device for automobile vehicles comprising in combination a vertically expansible trellis, a pair of supports for said trellis, a pair of arms depending from a bumper-bar and pivotally mounted on said supports, and a forwardly spring-biased shock absorber bar located above and rearwardly of said bumper and having a pair of depending arms pivotally mounted to said supports independently of the arms of said bumper-bar.

2. A new safety device for automobile vehicles comprising an extensible trellis having a fixed upper portion and a lower portion normally retained in a raised position corresponding to collapsed position of the trellis, arms oscillating in a vertical plane parallel to said trellis, located immediately therebehind and loosely connected to the fixed upper portion thereof, and whose free ends carry each a longitudinal groove, studs on the lower portion of the trellis adapted to engage in said grooves, said arms being spring biased to expand said trellis and adapted to act as a reinforcement therefor to keep it in a vertical plane when expanded.

BAUTISTA BALSA.